A. R. NORDSTROM.
FLYING MACHINE.
APPLICATION FILED DEC. 27, 1911.
1,061,108.
Patented May 6, 1913.
6 SHEETS—SHEET 6.
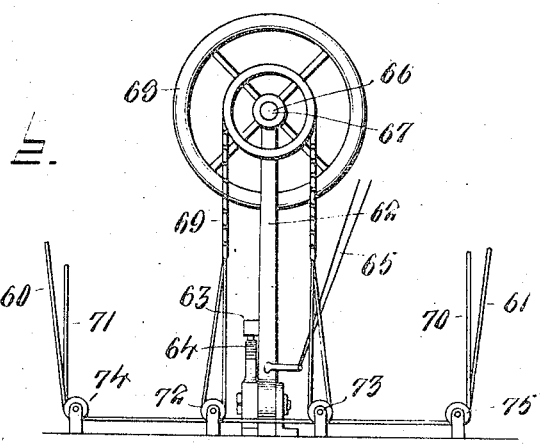
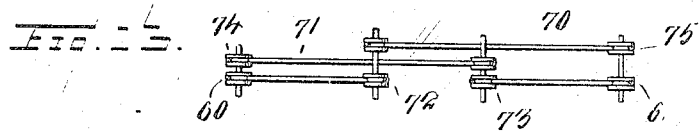
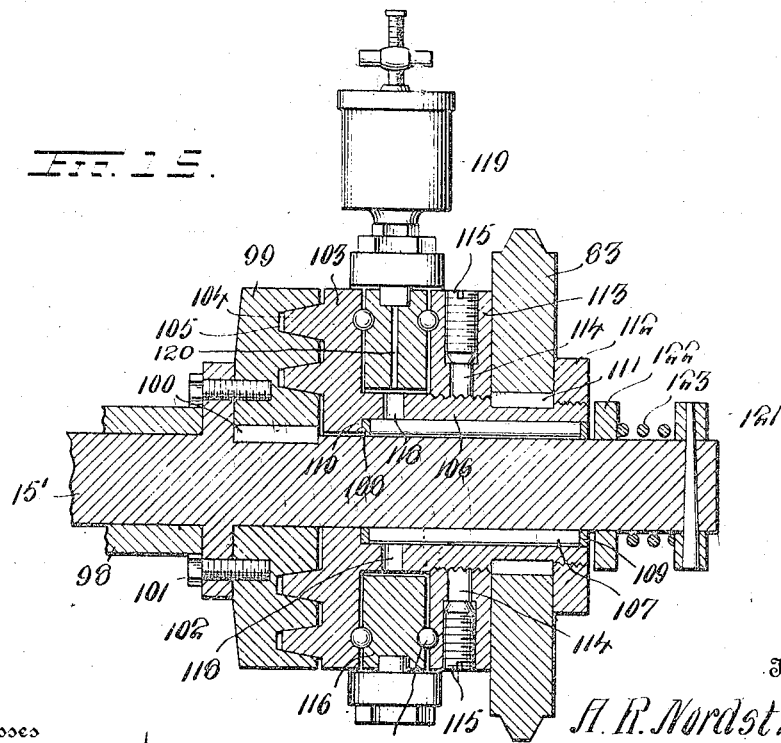
Witnesses
E. R. Ruppert
C. C. Hines
Inventor
A. R. Nordstrom
By Victor J. Evans
Attorney

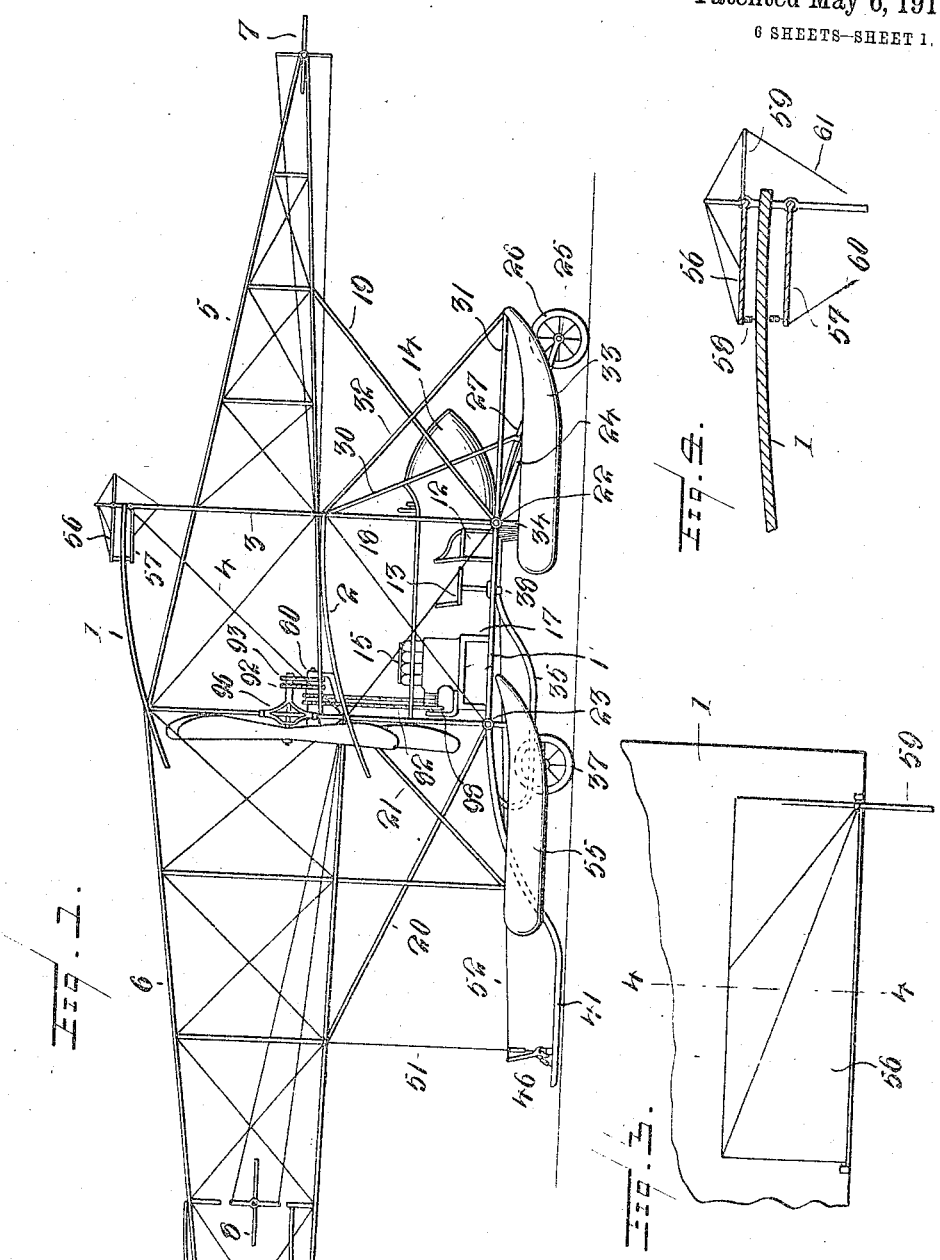

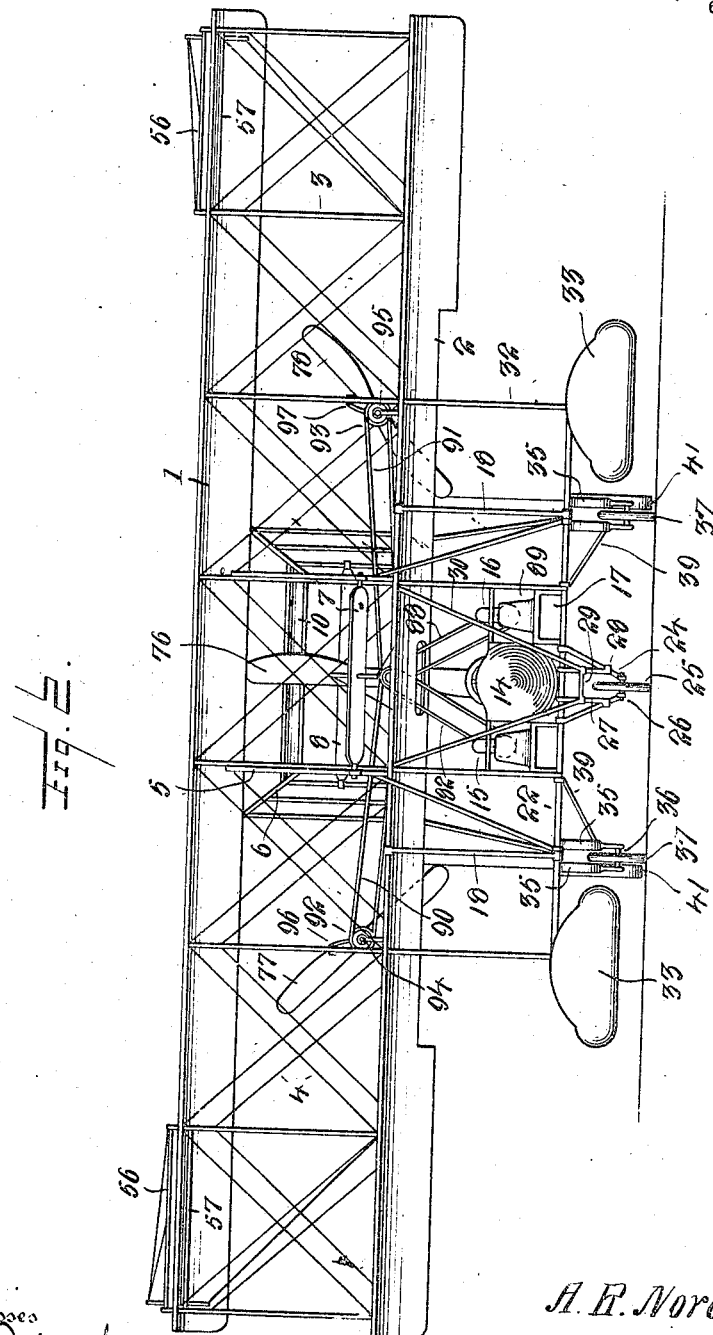

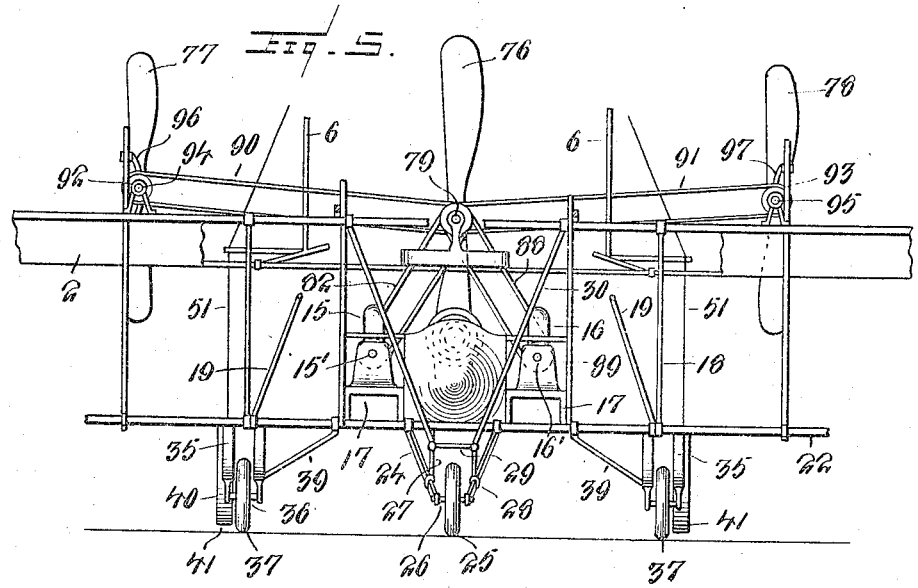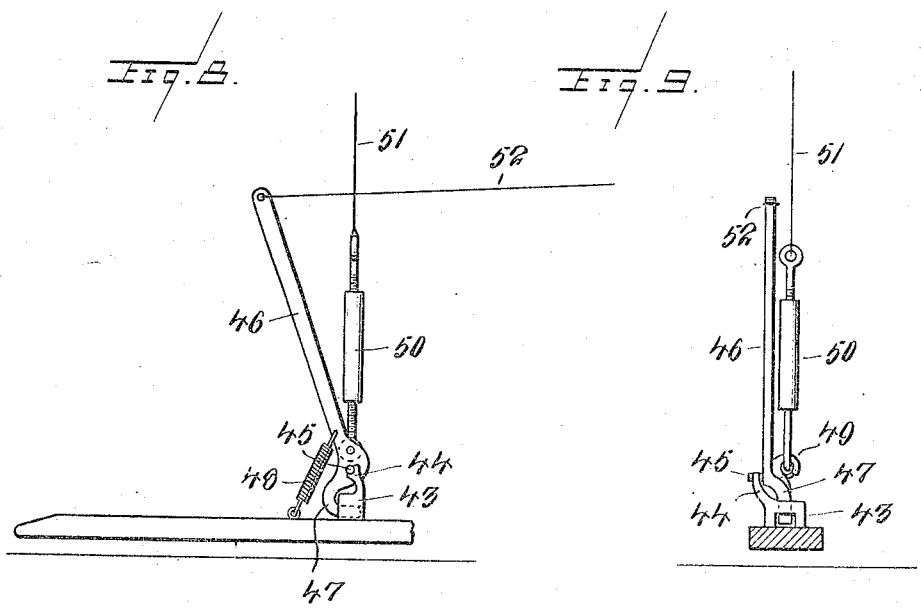

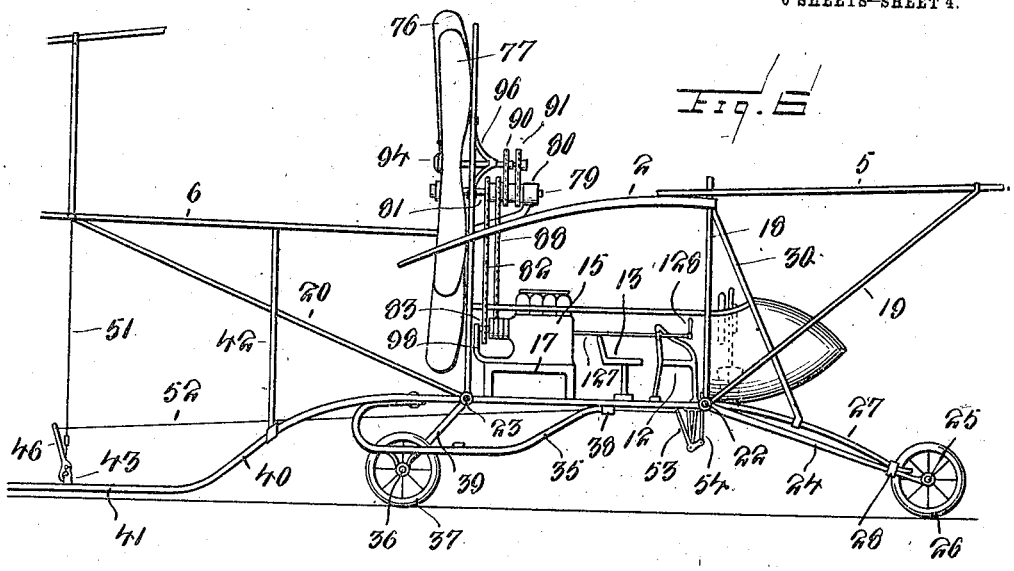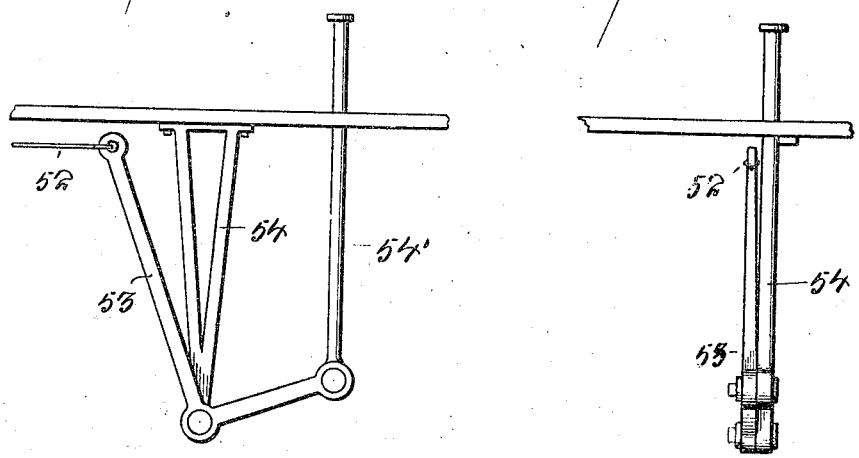

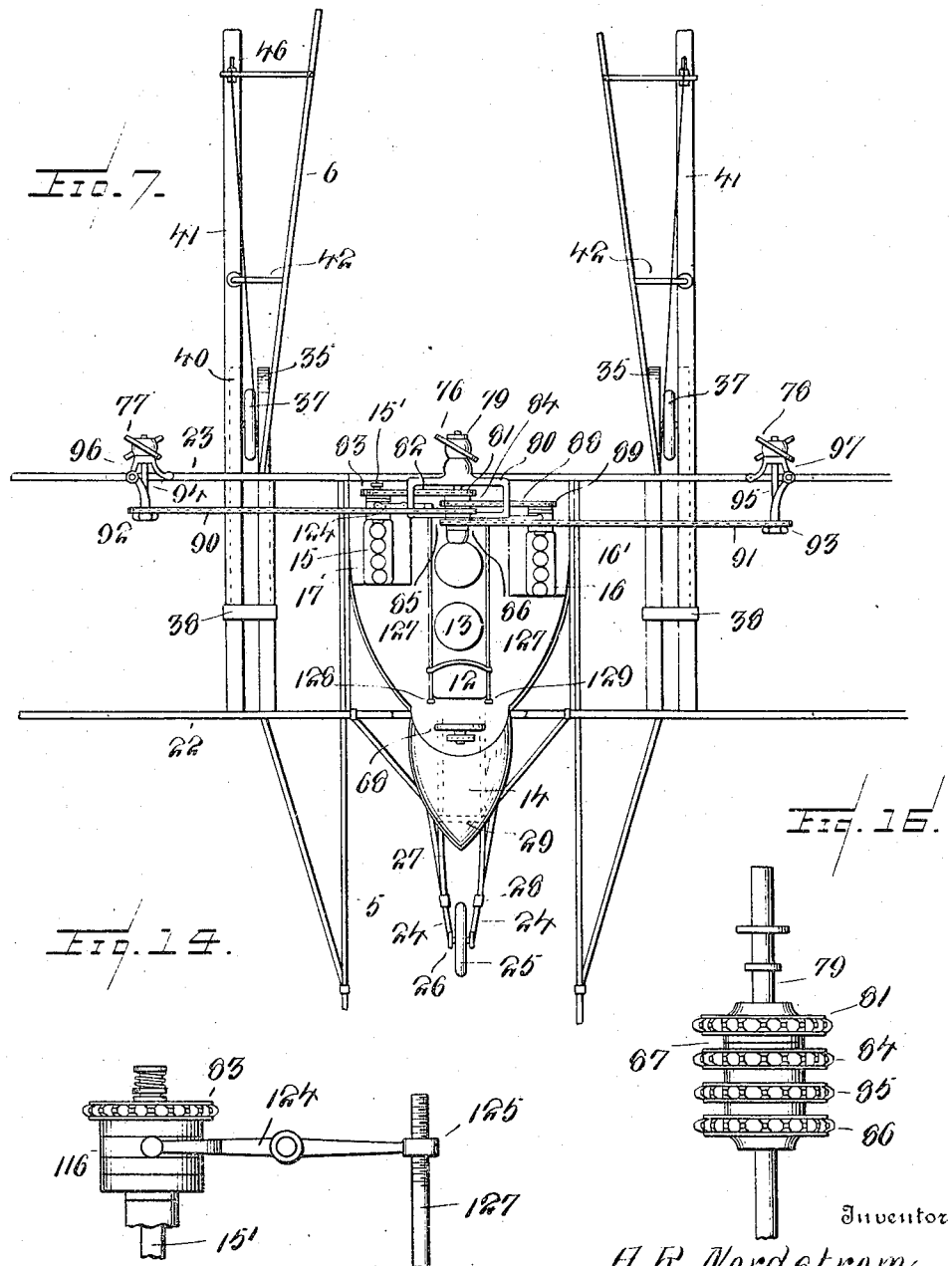

UNITED STATES PATENT OFFICE.

AXEL R. NORDSTROM, OF WEST LYNN, MASSACHUSETTS, ASSIGNOR OF ONE-FOURTH TO GUSTAF F. HELLSTROM, SR., AND GUSTAF F. HELLSTROM, JR., BOTH OF WEST LYNN, MASSACHUSETTS, AND THREE-SIXTEENTHS TO MARTIN BOWMAN, OF ROCK-PORT, MASSACHUSETTS, AND ONE-SIXTEENTH TO CARIN E. NORWALL, OF WEST LYNN, MASSACHUSETTS.

FLYING-MACHINE.

1,061,108.   Specification of Letters Patent.   Patented May 6, 1913.

Application filed December 27, 1911. Serial No. 668,046.

*To all whom it may concern:*

Be it known that I, AXEL R. NORDSTROM, a subject of the King of Sweden, residing at West Lynn, in the county of Essex and State of Massachusetts, have invented new and useful Improvements in Flying-Machines, of which the following is a specification.

This invention relates to flying machines of the aeroplane type.

One object of the invention is to provide a construction whereby the load weight is disposed wholly below the supporting surface or surfaces of the machine, giving a low center of gravity rendering the machine inherently stable and preventing loss of either the lateral or longitudinal balance.

Another object of the invention is to provide a novel construction and arrangement of carriage or chassis, cushioned launching and landing gear including skids, and means adapting the skids to serve as brakes, together with hydroplane floats adapting the machine to alight upon, run along and rise from a body of water.

Another object of the invention is to provide a novel construction and arrangement of motors, seats for the aviator and one or more passengers, and a guard or shield whereby the motors are adapted to be kept cool and the aviator and passenger protected from the force of the wind.

Another object of the invention is to provide a novel construction of ailerons for lateral balancing, and a novel construction of steering gear for adjusting the ailerons and direction rudder in unison for sensitive balancing and steering actions.

Another object of the invention is to provide a propelling mechanism embodying a double power system including separate and independent motors and propellers operated thereby, together with means for throwing the propellers into and out of action, the construction being such that in the event of the failure of one of said power systems the other will operate to maintain continuity of flight of the machine.

The invention consists of the features of construction, combination and arrangement of parts, hereinafter more fully described and claimed, reference being had to the accompanying drawings, in which:—

Figure 1 is a side elevation of a flying machine constructed in accordance with my invention. Fig. 2 is a front elevation of the same. Fig. 3 is a fragmentary top plan view of the upper supporting surface. Fig. 4 is a detail section on line 4—4 of Fig. 3. Fig. 5 is a sectional front elevation through the carriage and lower supporting surface. Fig. 6 is a vertical longitudinal section of the same. Fig. 7 is a sectional plan view of the parts shown in Fig. 5, omitting the lower supporting surface. Figs. 8 and 9 are side and front elevations of one of the skid holding and releasing devices. Figs. 10 and 11 are detail side and front views of the controlling device therefor. Fig. 12 is a front elevation of the steering and stabilizing gear. Fig. 13 is a plan view showing the arrangement of the pulleys and cables thereof. Fig. 14 is a vertical transverse section through one of the motor shafts and gearing thereon. Fig. 15 is a plan view of the same. Fig. 16 is a plan view of the counter shaft and transmission sprockets thereon.

In the present instance, I have shown the application of my invention to a flying machine of the biplane type, in which the superposed supporting planes or surfaces 1 and 2 are connected in the usual manner by struts 3 and stay wires 4, said machine being provided with head and tail frames 5 and 6 carrying the elevators or horizontal rudders 7 and 8. The tail frame also carries a vertical or direction rudder 9 and stabilizing planes or surfaces 10, which operate also to sustain the weight of the tail frame when the machine is in flight.

The machine is mounted upon a carriage or chassis comprising a car or platform 11 which supports the aviator's seat 12, one or more passenger's seats 13, and a substantially cigar-shaped or torpedo-shaped body or shield 14, in which these seats are inclosed, said body or shield serving to protect the aviator and passenger from the force of the wind. The seats 12 and 13 are preferably arranged in tandem relation in the central longitudinal line of the machine, in order that the weight of the occupants thereof may be properly distributed to trim or balance the machine. The car or platform 11 also supports a pair of motors 15 and 16, which rest upon suitable beds 17 arranged on opposite sides of the longitudinal center of the machine so as to properly position the motors for balancing effect and to dispose the same in the path of the air for an effective cooling action.

The car or platform 11 is secured to the frame of the plane 1 by vertical struts or stanchions 18, and said car or platform is reinforced from the head and tail frames by sets of braces 19 and 20, and from the frame of the lower plane by suitable braces 21, in connection with which suitable truss wires may be employed, if desired. The car or platform includes front and rear rods or tubes 22 and 23, which extend laterally beyond the platform to a required degree.

Forwardly converging bracket arms 24 are hinged at their rear ends to the rod 22 and incline downwardly and forwardly therefrom and form a support for an axle spindle 25 on which is journaled a front central supporting wheel 26. Also pivoted at their rear ends to the rod 22 are spring bars 27, the forward ends of which slidably engage cuffs or sleeves 28, secured to the arms 24, by which the wheel 26 is yieldingly mounted for a cushioning action. The spring bars 27 are coupled for movement in unison by a cross piece 29 and are reinforced from the frame of the plane 1 by braces 30, thus preventing the wheel 26 from having undue vertical play. Rods 31 also project from the bar 22 and are connected with the plane 1 by braces 32, said rods forming supports for the forward end of a pair of hydroplane floats 33, which are suspended at their rear ends from the rod 22 by short hangers 34.

Secured at their rear ends to the bar or platform 11 are looped suspension springs 35, arranged in pairs, each pair of springs forming a support for an axle spindle 36 carrying a rear supporting wheel 37, the two wheels being arranged on opposite sides of the longitudinal center of the machine and coöperating with the wheel 26 to support the machine upon the ground and to yieldingly sustain the shocks and jars in launching and landing. The forward ends of the springs 35 are slidably fitted in sockets 38 secured to the car to permit said springs to have vertical play. The rear ends of the springs are connected with the rod 23 by braces 39, which may be hinged or pivoted to allow the springs to have the requisite freedom of motion. Projecting from the rear of the platform are resilient bars 40 which are bent at their rear ends to provide skids or runners 41, which are stayed at their forward ends from the tail frame by braces 42. These skids or runners are adapted by their spring action to move downward in contact with the ground. For the purpose of holding said skids elevated and in an inoperative position, each skid is provided with a keeper socket 43 carrying a bearing member 44 engaged by a fulcrum pin 45 on the lower end of a holding and releasing lever 46, which terminates at its lower end in a hook or locking member 47 to engage the socket 43 and is connected with the skid above its pivotal point by a coiled contractile spring 48, normally serving to hold the hook in engagement with the socket. The lever is provided at one side with an eye or hook 49 which is engaged by the eye at one end of a turn buckle or tensioning device 50, which is connected with a stay wire 51 secured to the tail frame 6, whereby the lever is sustained in operative position. The two controlling levers 46 have cables 52 leading to one arm of a bell crank lever 53 fulcrumed on a bracket 54 attached to the car, to the other arm of which lever is coupled a sliding rod or controlling member 54', adapted to be depressed by the foot of the aviator, whereby the levers may be adjusted to throw the hooks 47 out of engagement with the sockets 43, allowing the skids to drop down into contact with the ground to serve as a brake to bring the machine to a quick stop in landing. Rear hydroplane floats 55 may be suitably supported from the car or carriage adjacent the rear supporting wheels 37.

Arranged at or near the lateral margins of the planes 2 are lateral balancing devices, each comprising a pair of ailerons or small planes 56 and 57 arranged respectively above and below the surfaces of said planes, and normally held in contact with the same by springs 58. Each pair of ailerons is adapted to be rocked vertically for laterally balancing the machine and is provided with a crank arm 59, to which crank arms are connected the outer ends of controlling wires or cables 60 and 61. These ailerons and the vertical and horizontal rudders are adapted to be actuated by a control device comprising a post 62 pivoted at its lower end to swing in a fore and aft direction and provided with a spring actuated pawl or dog 63 adapted to engage a rack 64 whereby it may be held in adjusted position. Cables 65 lead from said post to the respective horizontal rudders 7 and 8, whereby said rudders may be adjusted in unison. Journaled at the upper end of the post is a shaft or spindle 66 carrying a sprocket wheel 67 and a steering wheel 68. Connected with said sprocket wheel 67 is a short chain section 69, to which the inner ends of the cables 60 and 61 are attached, and to which are also respectively attached cables 70 and 71 leading to the vertical rudder 9, whereby when the steering wheel is turned in one direction or the other the ailerons and vertical rudder may be simultaneously adjusted. As shown, the cables 60 and 70 are attached to one end of the chain 69, while the cables 61 and 71 are attached to the opposite end of said chain 69. Arranged on opposite sides of the steering post are sets of guide pulleys 72, 73, 74 and 75, disposed in parallel, concentrically journaled pairs. The cable 71 leads from the right hand stretch of the chain over one of the pulleys 74 to the right hand side of the rudder 9, while the cable 70 leads around one of the pulleys 73 and one of the pulleys 75 to the left hand side of the rudder. The cable 60 is attached to the right hand side of the chain and leads over the other pulleys 72 and 74 to the ailerons at the right hand side of the machine, while the cable 71 leads from the left hand side of the chain 69 over the other pulleys 73 and 74 to the ailerons at the right hand side of the machine. It will thus be seen that when the steering wheel is turned in either direction for steering or balancing control, the vertical rudder will be adjusted toward that side of the machine at which the ailerons present the least angle of incidence, thus operating to check or retard such side of the machine and preventing it from traveling faster than the other side of the machine, by which proper control of the machine is accorded in both balancing the machine on its longitudinal axis and steering and banking the machine laterally in either direction.

The propelling mechanism comprises a central propeller 76, disposed in the central longitudinal line of the machine, and side propellers 77 and 78, arranged equidistantly on opposite sides of said central propeller. The propeller 76 is fixed to a counter-shaft 79 journaled in a suitable bearing bracket 80. This shaft carries a fixed sprocket wheel 81 connected by a chain 82 with a sprocket wheel 83 on the shaft of the engine 15, whereby said propeller 76 is driven. Said shaft 79 also carries a series of sprocket wheels 84, 85 and 86 fixed to a sleeve 87 revolubly mounted on said shaft 79, antifriction roller or ball bearings being preferably disposed between said sleeve and shaft to reduce friction. The sprocket wheel 84 is connected by a chain 88 with a sprocket wheel 89 on the shaft of the engine 16, and chains 90 and 91 connect the sprocket wheels 85 and 86 with sprocket wheels 92 and 93 on the shafts 94 and 95 of the propellers 77 and 78, which shafts are journaled in suitable counterpart bearing brackets 96 and 97, whereby the said propellers 77 and 78 are driven from the engine 16. While the propellers 77 and 78 are shown in the present instance as arranged to rotate in the same direction, it will of course be understood that one of the chains 90 and 91 may be crossed to drive the two side propellers in opposite directions. In practice, when the side propellers are geared to rotate in the same direction, the central propeller 76 will be geared to rotate in the opposite direction, so that the side thrust of the side propellers will be counteracted by the thrust of the central propeller to prevent divergence of the machine from a straight course of travel.

Clutch devices are provided upon the shafts 15' and 16' of the respective engines 15 and 16, whereby the propellers may be thrown into and out of action at will, without stopping the engines, and whereby in the event of the failure of either propelling system the other may be set into or maintained in operation to adapt the machine to secure a continuance of driving motion of the machine. As these clutch devices are similar in construction, a description of one will suffice for both. As shown, the shaft 15' of the motor 15 is journaled in a suitable bearing 98 and has fixed thereto the friction clutch disk or member 99, which is shown as keyed to the shaft, as indicated at 100 and also fixed to the shaft by screws 101 passing through an annular flange 102 on said shaft.

Loosely mounted on the shaft is a complementary adjustable friction disk or member 103, the side of which adjacent the disk 99 is provided with annular tapered rings or projections 104 to frictionally engage the walls of similarly shaped grooves 105 formed in the disk 99, so that by adjusting said disk 103 longitudinally on the shaft it may be connected with the shaft to revolve therewith or disconnected so as to remain stationary while the shaft is in motion. The opposite side of the disk 103 is provided with a sleeve 106 formed to receive antifriction roller bearings 107 interposed between the same and the shaft, which roller bearings are held from endwise movement by bearing washers 108 and 109, the inner bearing washer 108 engaging a shoulder 110 at the inner end of the bore of the sleeve.

Keyed to the outer end of the sleeve, as at 111, is the sprocket wheel 83 or 89, as the case may be, which is retained against the outward movement by a threaded ring or collar 112. Said sprocket wheel is disposed between the ring 112 and a collar or retaining member 113 threaded on the shaft and provided with gibs or keys 114 to engage the threads, which gibs or keys are secured in position by adjustable screw plugs 115. The member 113 forms with the adjacent side of the disk 103 an annular groove receiving a shifting ring 116, between which and the faces of the disk and collar 113 are interposed the antifriction bearings 117. The sleeve 106 is provided with annular series of oil ducts or channels 118, and the shifting ring 116 carries a lubricator 119 communicating with an oil feed duct or channel 120 therein, which is adapted to supply lubricant to the ducts 118, by which it is distributed to the various bearing surfaces.

At the outer or free end of the shaft is arranged a suitable stop 121 between which and a sliding disk or head 122 fitted on the shaft is arranged a coiled pressure spring 123. The head 122 under pressure of the spring normally serves to slide the friction disk 103 inward and to connect the two disks 103 and 99 to couple the sprocket wheel to the shaft and allows sufficient outward longitudinal sliding movement of the parts to throw the friction faces of the disks out of engagement with each other, to permit them to turn independently of the sprocket wheel. The ring 116 is engaged by the forked end of a shipper lever 124, the opposite end of which is provided with an eye 125 internally threaded to receive the rear threaded end 126 of an adjusting rod 127, the rods of the two clutch devices being journaled at their forward ends in bearings on the aviator's seat 12 and respectively provided with handles 128 and 129 whereby said rods may be turned to shift the respective shipper levers 124 by their threaded engagement therewith, so as to adjust the shifting rings 116 on the respective engine shafts 15' and 16'. One of the rods 127 preferably has a right hand threaded engagement with the eye 125 of the coacting shipper lever 124, while the other rod 127 preferably has a left hand threaded engagement with its coacting shipper lever, whereby the two clutches are adapted to be controlled by outward and inward lateral swinging movements of the handles 128 and 129, as will be readily understood. It will thus be seen that both motors may be maintained in operation and either the central or side propellers employed for a driving action, or all three propellers employed to secure maximum power in launching the machine and driving the same to the desired altitude before beginning a straight flight. It will also be seen that this construction permits the motors to be set into action by the aviator without driving the propellers, so that the aviator may start the propellers at his convenience in beginning a flight. If, during flight, either motor or any part of the propelling system actuated thereby should become inoperative, the other propelling system may be set in action to maintain flight, the advantages of which will be apparent.

Having thus described the invention, what I claim as new is:

1. A flying machine including a platform, a housing carried by said platform and forming a car body, a motor mounted upon the platform, an aviator's seat mounted upon the platform in front of the motor, a main frame rising from said platform, superposed supporting surfaces carried by said frame and arranged above the platform, head and tail frames extending from the main frame on a line between said supporting surfaces, rudder planes supported by said head and tail frame extensions, a driving propeller arranged to operate in a plane substantially between said supporting surfaces and at the rear of the main frame, gearing between said propeller and the motor extending through the lower supporting surface, extensions at the front and rear of the platform having reinforcing connections with the main frame and head and tail frames, and a suitable launching and landing gear supported by said latter-named extensions.

2. In a flying machine, the combination of a car or platform, a main frame rising therefrom, superposed supporting surfaces carried by said main frame above said car or platform, head and tail extensions from the main frame on a line between said supporting surfaces, rudder planes carried by said head and tail extensions, a motor mounted upon the platform, one or more driving propellers operated by gearing from the motor, said propellers being arranged to revolve vertically on horizontal longitudinal axes on a line between the supporting surfaces, extensions from the front and rear of the platform having reinforcing connections with the main frame and head and tail frames, transverse rods forming a part of the main frame and extending laterally beyond the opposite sides of the car to form supporting outriggers, cushioned launching and landing wheels supported by said front and rear extensions from the car or platform, and front and rear pairs of hydroplanes supported by the outriggers.

3. A flying machine including a platform, a car body carried thereby, a main frame rising from said platform and car body, front and rear extensions from the main frame in line with the platform, outriggers projecting laterally from said extensions, hydroplanes supported by said outriggers, superposed supporting planes upon the main frame above the platform and car, head and tail frames projecting from the main frame on a line between the supporting planes, braces reinforcing the same from the car or platform, rudder planes supported by said head and tail frames, a motor mounted upon the platform, and suitable propelling mechanism driven from said motor.

In testimony whereof I affix my signature in presence of two witnesses.

AXEL R. NORDSTROM.

Witnesses:
 JOHN H. MATTSON,
 GUSTAF F. HELLSTROM.